(12) United States Patent
Tanaka

(10) Patent No.: US 10,514,115 B2
(45) Date of Patent: Dec. 24, 2019

(54) FLEXIBLE TUBE

(71) Applicant: Mitsubishi Electric Corporation, Chiyoda-ku, Tokyo (JP)

(72) Inventor: Tetsuya Tanaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/554,028

(22) PCT Filed: May 10, 2016

(86) PCT No.: PCT/JP2016/063871
§ 371 (c)(1),
(2) Date: Aug. 28, 2017

(87) PCT Pub. No.: WO2016/190084
PCT Pub. Date: Dec. 1, 2016

(65) Prior Publication Data
US 2018/0073668 A1    Mar. 15, 2018

(30) Foreign Application Priority Data
May 28, 2015   (JP) .................................. 2015-108674

(51) Int. Cl.
*F16L 11/118*   (2006.01)
*F16L 11/15*    (2006.01)
*B32B 27/32*    (2006.01)
*F16L 11/04*    (2006.01)

(52) U.S. Cl.
CPC ............ *F16L 11/15* (2013.01); *B32B 27/322* (2013.01)

(58) Field of Classification Search
CPC ........................... F16L 11/15; F16L 2011/047
USPC .................... 138/121, 122, 109, 137, 140
See application file for complete search history.

(56) References Cited

U.S. PATENT DOCUMENTS

| | | | | |
|---|---|---|---|---|
| 4,196,031 A | * | 4/1980 | Lalikos | ................... B29C 53/12 138/121 |
| 4,342,612 A | * | 8/1982 | Lalikos | ................. B29C 53/305 138/121 |
| 4,706,713 A | | 11/1987 | Sadamitsu et al. | |
| 5,803,132 A | * | 9/1998 | Lupke | ................. B29C 47/0023 138/121 |

(Continued)

FOREIGN PATENT DOCUMENTS

| | | |
|---|---|---|
| CN | 202756787 U | 2/2013 |
| DE | 2332600 A1 | 1/1975 |

(Continued)

OTHER PUBLICATIONS

International Search Report (PCT/ISA/210) dated Jun. 21, 2016, by the Japanese Patent Office as the International Searching Authority for International Application No. PCT/JP2016/063871.

(Continued)

*Primary Examiner* — Patrick F Brinson
(74) *Attorney, Agent, or Firm* — Buchanan Ingersoll & Rooney PC

(57) ABSTRACT

A flexible tube includes a tube body made of metal and having a bellows shape, and a tube circumference covering made of metal and covering the tube body, in which a fluorine-based resin film is provided between the tube body and the tube circumference covering.

9 Claims, 2 Drawing Sheets

(56) References Cited

U.S. PATENT DOCUMENTS

| | | | |
|---|---|---|---|
| 6,354,332 B1 | 3/2002 | Burkhardt et al. | |
| 2004/0227343 A1 | 11/2004 | Takagi et al. | |
| 2005/0211325 A1* | 9/2005 | Takagi | F16L 11/085 138/121 |
| 2006/0042711 A1 | 3/2006 | Hibino et al. | |
| 2007/0221281 A1* | 9/2007 | Takagi | F16L 11/085 138/109 |
| 2013/0192708 A1 | 8/2013 | Strunk | |

FOREIGN PATENT DOCUMENTS

| | | |
|---|---|---|
| DE | 19531796 C1 | 4/1997 |
| JP | 61-157785 U | 9/1986 |
| JP | H05-039121 U | 5/1993 |
| JP | 2000-337572 A | 12/2000 |
| JP | 2002-36382 A | 2/2002 |
| JP | 2004-156672 A | 6/2004 |
| JP | 2004-263866 A | 9/2004 |
| JP | 2006-64149 A | 3/2006 |
| JP | 2007-278433 A | 10/2007 |

OTHER PUBLICATIONS

Written Opinion (PCT/ISA/237) dated Jun. 21, 2016, by the Japanese Patent Office as the International Searching Authority for International Application No. PCT/JP2016/063871.

Office Action (Notification of Reasons for Refusal) dated Oct. 16, 2018, by the Japanese Patent Office in corresponding Japanese Patent Application No. 2017-520601 and English translation of the Office Action. (6 pages).

Office Action dated Oct. 12, 2018, by the Chinese Patent Office in corresponding Chinese Patent Application No. 201680027996.2 and English translation of the Office Action. (9 pages).

Extended European Search Report dated Dec. 4, 2018, issued by the European Patent Office in corresponding European Application No. 16799792.3. (7 pages).

Office Action dated May 14, 2019, by the Chinese Patent Office in corresponding Chinese Patent Application No. 201680027996.2 and English translation of the Office Action. (10 pages).

Office Action dated Oct. 29, 2019 in corresponding Chinese Patent Application No. 2016-80027996.2 with English Translation, 9 pages.

* cited by examiner

FLEXIBLE TUBE

TECHNICAL FIELD

The present invention relates to a flexible tube.

BACKGROUND ART

A flexible tube is conventionally equipped, for example, with a refrigerant-tight, corrugated metal hose that is enclosed in a flexible metal cladding resistant to pressure in a radial direction, with radial spacing provided between the corrugated hose and the metal cladding. With this configuration, the corrugated metal hose leads refrigerant to a predetermined location while maintaining airtightness. Here, when the corrugated metal hose circulates refrigerant sent, for example, from a refrigerant compressor, the corrugated metal hose alone cannot withstand pressure of the refrigerant and pressure pulsation caused by a refrigerant compressor. Consequently, the flexible metal cladding resistant to radial pressure bears pressure acting on the corrugated hose and other forces. Also, when the corrugated hose is subjected to an internal pressure load, an axial force is caused in the corrugated hose to try to grow in length, and the flexible metal cladding bears the axial force as well.

When the refrigerant pressure and pressure pulsation described above are produced, friction occurs between the corrugated metal hose and flexible metal cladding, which might lead to breakage of ridges on an outer side of the corrugated metal hose in the radial direction. Thus, a flexible tube has been proposed that absorbs the friction by installing an intermediate member such as a plastic hose between the corrugated metal hose and flexible metal cladding (see Patent Literature 1).

CITATION LIST

Patent Literature

Patent Literature 1: Japanese Unexamined Patent Application Publication No. 2000-337572

SUMMARY OF INVENTION

Technical Problem

With the flexible tube described in Patent Literature 1, the plastic hose, which is an intermediate member, bites into ridge portions of the corrugated metal hose, curbing slippage between the ridge portions of the corrugated metal hose and the flexible metal cladding, and thereby increases flexural rigidity of the flexible tube. Similarly, the plastic hose, which is an intermediate member, is filled between the flexible metal cladding and the ridge portions of the corrugated metal hose, thereby increasing flexural rigidity of the flexible tube.

As a result, a problem is caused in that the flexible tube is caused to lose inherent flexibility, failing to fully achieve vibration insulation, which is a function expected of the flexible tube, where the vibration insulation is a function to insulate vibration propagation between a vibration source and a structure surrounding the vibration source. The above problem becomes notable especially when displacement caused during use of the flexible tube is large compared to thickness of the flexible metal cladding. Also, a problem is caused in that the flexible tube increases in weight when the plastic hose, which is an intermediate member, is filled into the flexible tube.

The present invention has been made in view of the above problems and has an object to provide a flexible tube that can reduce weight while ensuring a sufficient vibration insulation function without causing loss of flexibility.

Solution to Problem

A flexible tube according to an embodiment of the present invention includes a tube made of metal and having a bellows shape, a covering made of metal and covering the tube, and a fluorine-based resin film provided between the tube and the covering.

Advantageous Effects of Invention

In the flexible tube according to an embodiment of the present invention, the fluorine-based resin film is provided between the bellows-shaped tube made of metal and the flexible covering made of metal. This configuration can provide a flexible tube that can reduce weight while ensuring a sufficient vibration insulation function without causing loss of flexibility.

DESCRIPTION OF EMBODIMENTS

Figure 1:
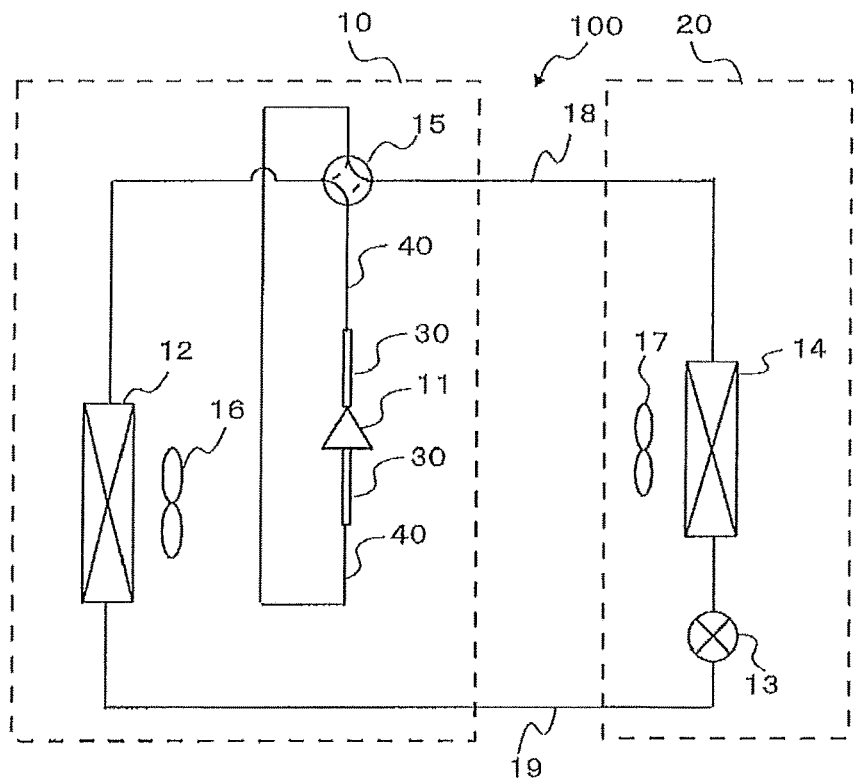
FIG. 1 is a schematic diagram showing an overall configuration of a refrigerant circuit that uses flexible tubes according to Embodiment 1 of the present invention.

Embodiments of a flexible tube according the present invention will be described below with reference to the drawings. Note that the embodiments shown in the drawings are examples and are not intended to limit the present invention. Also, in the drawings, components denoted by the same reference signs are the same or equivalent components. The reference signs apply to the entire text of the specification. Furthermore, in the following drawings, components may not be shown in their true size relations.

Embodiment 1

FIG. 1 is a schematic diagram showing an overall configuration of a refrigerant circuit that uses flexible tubes according to Embodiment 1 of the present invention. As shown in FIG. 1, an air-conditioning system 100 includes an outdoor unit 10 and an indoor unit 20. The outdoor unit 10 and indoor unit 20 are interconnected by a main refrigerant pipe 18 and main refrigerant pipe 19.

[Configuration of Outdoor Unit 10]

The outdoor unit 10 is equipped with a compressor 11, a selector valve 15 such as a four-way valve, and a heat source side heat exchanger 12, which are connected via flexible tubes 30 and refrigerant pipes 40. Also, the outdoor unit 10 is equipped with an outdoor fan 16.

The compressor 11 is designed to suck low-temperature and low-pressure refrigerant and compress the refrigerant into a high-temperature and high-pressure state and is made up, for example, of a capacity-controllable inverter compressor or other components. The flexible tubes 30 are provided to a discharge side and suction side of the compressor 11, i.e., between each one of the refrigerant pipes 40 and the compressor 11. The compressor 11 sucks refrigerant from the refrigerant pipe 40 on the suction side through the flexible tube 30, and discharges the refrigerant to the refrigerant pipe 40 through the flexible tube 30 on the discharge side.

The selector valve 15 has a function to switch a flow direction of the refrigerant. For cooling operation, the selector valve 15 switches a refrigerant flow path such that the discharge side of the compressor 11 and a gas side of the heat source side heat exchanger 12 will be connected with each other and that the suction side of the compressor 11 and a load side heat exchanger 14 will be connected with each other (solid lines at the selector valve 15 on FIG. 1). Consequently, during cooling operation, the heat source side heat exchanger 12 acts as a condenser for the refrigerant compressed by the compressor 11 while the load side heat exchanger 14 acts as an evaporator for the refrigerant condensed by the heat source side heat exchanger 12. Note that, although a four-way valve is used as the selector valve 15 in the example shown in Embodiment 1, the present invention is not limited to this configuration, and that the selector valve 15 may be made up of a valve or other components capable of changing the refrigerant flow path as appropriate. Also, when the air-conditioning system 100 is used only for cooling operation or heating operation or otherwise has limited application, the selector valve 15 is not necessary to be installed.

The heat source side heat exchanger 12 is preferably a cross fin type fin-and-tube heat exchanger made up of a heat transfer tube and a large number of fins or is preferably another similar heat exchanger. With a gas-side pipe connected to the selector valve 15 and with a liquid-side pipe connected to the side of the load side heat exchanger 14, the heat source side heat exchanger 12 acts as a refrigerant condenser during cooling operation, and as a refrigerant evaporator during heating operation.

The outdoor fan 16 is capable of varying a flow rate of air supplied to the heat source side heat exchanger 12 and is made up, for example, of a propeller fan driven by a DC motor, which is not shown. The outdoor fan 16 has a function to suck outside air into the outdoor unit 10 and discharge air that has exchanged heat with the refrigerant in the heat source side heat exchanger 12 out of a room. Note that, in the example shown in Embodiment 1, the outdoor fan 16 supplies air to the heat source side heat exchanger 12. However, the present invention is not limited to this configuration, and depending on the type of heat source side heat exchanger 12, a pump or other components configured to feed a fluid for use to exchange heat with the refrigerant may be installed instead of the outdoor fan 16.

[Configuration of Indoor Unit 20]

The indoor unit 20 is equipped with an indoor fan 17, the load side heat exchanger 14, and an expansion valve 13. The indoor unit 20 is connected with the outdoor unit 10 through the main refrigerant pipe 18 and main refrigerant pipe 19, and the refrigerant flows in and out of the indoor unit 20.

The load side heat exchanger 14 is preferably a cross fin type fin-and-tube heat exchanger made up of a heat transfer tube and a large number of fins or is preferably another similar heat exchanger. With a gas-side pipe connected to the selector valve 15 and with a liquid-side pipe connected to the side of the heat source side heat exchanger 12, the load side heat exchanger 14 acts as a refrigerant evaporator during cooling operation, and as a refrigerant condenser during heating operation.

The indoor fan 17 is capable of varying a flow rate of air supplied to the load side heat exchanger 14 and is made up, for example, of a propeller fan driven by a DC motor, which is not shown. The indoor fan 17 has a function to suck outside air into the indoor unit 20 and discharge air that has exchanged heat with the refrigerant in the load side heat exchanger 14 out of a room. Note that, in the example shown in Embodiment 1, the indoor fan 17 supplies air to the load side heat exchanger 14. However, the present invention is not limited to this configuration, and depending on the type of load side heat exchanger 14, a pump or other components configured to feed a fluid for use to exchange heat with the refrigerant may be installed instead of the indoor fan 17.

The expansion valve 13 has a function to decompress or expand the refrigerant and is preferably made up of a valve whose opening degree is variably controllable, such as an electronic expansion valve. Note that, although in the example shown in Embodiment 1, the expansion valve 13 is installed in the indoor unit 20, the present invention is not limited to this configuration, and that the expansion valve 13 may be installed in the outdoor unit 10.

As described, the compressor 11, heat source side heat exchanger 12, expansion valve 13, and load side heat exchanger 14 are connected in sequence via the refrigerant pipes 40, the main refrigerant pipe 18, and the main refrigerant pipe 19, making up a refrigerant circuit of the air-conditioning system 100.

[Configuration of Flexible Tube 30]

Figure 2:
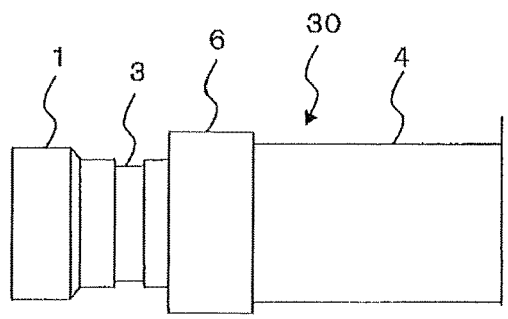
FIG. 2 is a schematic diagram showing an external appearance of each one of the flexible tubes according to Embodiment 1 of the present invention.
Figure 3:
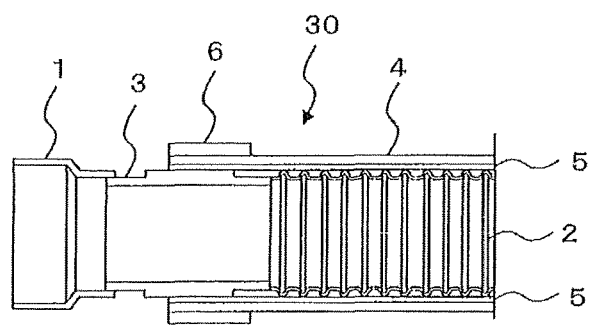
FIG. 3 is a schematic sectional view of the flexible tube according to Embodiment 1 of the present invention.

FIG. 2 is a schematic diagram showing an external appearance of each one of the flexible tubes according to Embodiment 1 of the present invention. FIG. 3 is a schematic sectional view of the flexible tube according to Embodiment 1 of the present invention. Note that, because opposite ends of each one of the flexible tubes 30 have a same structure, only one end of the flexible tube 30 is illustrated in FIGS. 2 and 3. As shown in FIGS. 2 and 3, the flexible tube 30 is equipped at each end with a connecting portion 1 to be connected to the compressor 11, refrigerant pipe 40, or other components. Also, the flexible tube 30 includes a tube body 2 made up of a bellows-shaped metal body, and metal fittings 3 configured to connect the tube body 2 with the connecting portions 1. Furthermore, the flexible tube 30 includes a tube circumference covering 4 made of metal and configured to be flexible and cover the tube body 2, and metal fixtures 6 configured to fix the tube circumference covering 4 to the metal fittings 3.

Note that the tube body 2 corresponds to a "tube" according to the present invention. Also, the tube circumference covering 4 corresponds to a "covering" according to the present invention.

A resin film 5 that is a solid and is sufficiently thin compared to the tube circumference covering 4 is formed on an inner circumferential surface of the tube circumference covering 4. The resin film 5 is made of a fluorinated resin such as polytetrafluoroethylene (PTFE), tetrafluoroethylene-perfluoroalkyl vinyl ether copolymer (PFA), tetrafluoroethylene-hexafluoropropylene copolymer (FEP), and tetrafluoroethylene-ethylene copolymer (ETFE).

With this configuration, as a flexible member, the tube body 2 leads a fluid such as refrigerant to a predetermined location while maintaining airtightness. However, the tube body 2 alone cannot withstand high pressure of the refrigerant discharged from the compressor 11, and cannot withstand pressure pulsation caused by the compressor 11 either. Thus, the tube body 2 is covered and supported by the flexible, metal-made, tube circumference covering 4 resistant to radial pressure.

[Production Process of Flexible Tube 30]

Next, a production process of the flexible tube 30 will be described. First, fluorinated resin with excellent heat resistance and lubricity is sprayed onto an inner surface of the tube circumference covering 4 by a spray gun, sprayer, or other tools, and a thin layer of resin film 5 is formed by firing or other methods. At this time, thickness of the resin film 5 is set to be, for example, 10 μm to 100 μm thick. Note that, although in the example shown in Embodiment 1, fluorinated resin is sprayed by a spray gun, sprayer, or other tools, the present invention is not limited to this configuration, and that the fluorinated resin may be applied by brush coating or other methods as long as a thin layer of resin film 5 can be formed uniformly. Alternatively, the resin film 5 may be prepared as a preformed film strip and then pasted onto the inner circumferential surface of the tube circumference covering 4. In this case, because the preformed strip of resin film 5 allows unevenness of film thickness to be kept at a lower level than a method of straying resin, the film thickness of the resin film 5 is easy to be kept uniform.

Next, opposite ends of the bellows-shaped tube body 2 are each joined to a corresponding one of the metal fittings 3. Then, the bellows-shaped tube body 2 with the opposite ends joined to the metal fittings 3 is inserted into the tube circumference covering 4. Furthermore, at the opposite ends of the tube body 2, the tube circumference covering 4 and metal fittings 3 are fastened together by the metal fixtures 6. Finally, at the opposite ends of the tube body 2, the connecting portions 1 are joined to the metal fittings 3.

Figure 4:
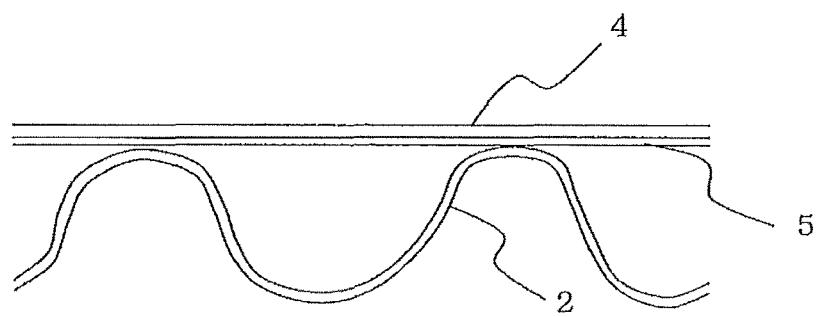
FIG. 4 is an enlarged schematic view of a contour of the flexible tube according to Embodiment 1 of the present invention.

FIG. 4 is an enlarged schematic view of a contour of the flexible tube according to Embodiment 1 of the present invention. In the flexible tube 30 assembled by the method described above, ridge portions of the bellows of the tube body 2 are placed in direct contact with the thin solid resin film 5 as shown in FIG. 4, allowing the ridge portions of the bellows to slide smoothly along the solid resin film 5 at the interface. Consequently, even if the flexible tube 30 deforms greatly, the tube body 2 does not rub directly against the metal of the tube circumference covering 4 on an inner surface of the tube circumference covering 4, and is allowed to slide without being scratched.

[Advantageous Effects of Embodiment 1]

Thus, according to Embodiment 1, the flexible tube 30 includes the bellows-shaped tube body 2 made of metal and configured to circulate a fluid, and the tube circumference covering 4 made of metal and covering the tube body 2, in which the fluorine-based resin film 5 is provided between the tube body 2 and the tube circumference covering 4. Consequently, the ridge portions of the bellows of the tube body 2 are free from wear, and thus from scratches, providing the advantage that the tube body 2 is resistant to fatigue failure. Also, the resin film 5 formed of fluorinated resin is superior to an intermediate member such as a plastic hose in heat resistance, and thus can withstand temperature of high-temperature refrigerant discharged from the compressor 11. This configuration provides the advantage of improving durability of the flexible tube 30 as well.

Also, the resin film 5, which is sufficiently thin compared to the tube circumference covering 4, does not increase hardness of the flexible tube 30. Also, excellent lubricity is available between the tube body 2 and resin film 5 as described above. Consequently, flexible bending of the tube is not obstructed. Thus, the flexible tube 30 can provide a sufficient vibration insulation effect.

Also, the resin film 5, which is a solid, changes minimally, even if the resin film 5 is subjected to internal pressure from the tube body 2, and thus provides the advantage of not jutting out of the tube circumference covering 4.

Furthermore, the fluorine-based resin film 5 is provided on the inner circumferential surface of the tube circumference covering 4. This configuration provides a space between the tube body 2 and resin film 5, offering the advantage of being able to reduce weight of the hose as well as the advantage of providing effective protection against penetration of adverse factors into the tube body 2 and resulting corrosion and other problems of the tube body 2.

Embodiment 2

A basic configuration of a flexible tube 30 according to Embodiment 2 is similar to that of the flexible tube 30 according to Embodiment 1, and thus Embodiment 2 will be described below by focusing on a difference from Embodiment 1. The difference of Embodiment 2 from Embodiment 1 lies in that the resin film 5 is provided on an outer circumferential surface of the tube body 2.

Figure 5:
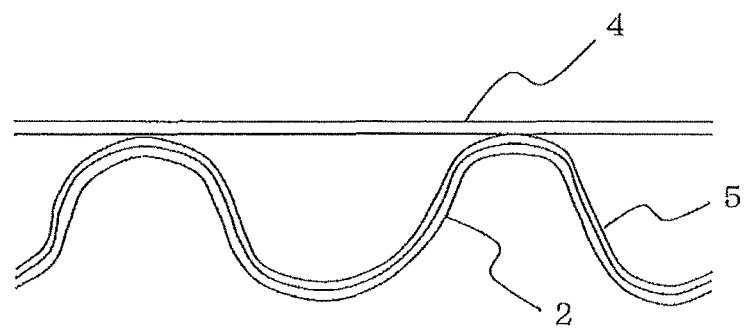
FIG. 5 is an enlarged schematic view of a contour of each one of flexible tubes according to Embodiment 2 of the present invention.

FIG. 5 is an enlarged schematic view of a contour of each one of the flexible tubes according to Embodiment 2 of the present invention. As shown in FIG. 5, the fluorine-based resin film 5 is formed on the outer circumferential surface of the tube body 2. The ridge portions of the bellows of the tube body 2 are covered with the thin solid resin film 5, allowing the resin film 5 on the ridge portions of the bellows of the tube body 2 to slide smoothly along the inner circumferential surface of the tube circumference covering 4. Consequently, even if the flexible tube 30 deforms greatly, the tube body 2 does not rub directly against the metal of the tube circumference covering 4 on an inner surface of the tube circumference covering 4, and is allowed to slide without being scratched.

Thus, the fluorine-based resin film 5 is provided on the outer circumferential surface of the tube body 2. Consequently, in addition to the advantages of Embodiment 1, Embodiment 2 has a capability to provide the resin film 5 between the tube body 2 and the tube circumference covering 4 even if material problems are caused such as inability of the tube circumference covering 4 to withstand sintering of the resin film 5. Also, even if the tube circumference covering 4 has a large number of gaps, causing the resin film 5 to be difficult to be formed, the resin film 5 can be provided between the tube body 2 and tube circumference covering 4.

REFERENCE SIGNS LIST 1 connecting portion 2 tube body 3 metal fitting 4 tube circumference covering 5 resin film 6 metal fixture 10 outdoor unit 11 compressor 12 heat source side heat exchanger 13 expansion valve 14 load side heat exchanger 15 selector valve 16 outdoor fan 17 indoor fan 18 main refrigerant pipe 19 main refrigerant pipe 20 indoor unit 30 flexible tube 40 refrigerant pipe 100 air-conditioning system

The invention claimed is:

1. A flexible tube comprising:
   a tube made of metal and having a bellows shape;
   a covering made of metal and covering the tube; and
   a fluorine-based resin film provided between the tube and the covering, wherein
   a thickness of the fluorine-based resin film is less than a thickness of the covering, the thickness of the fluorine-based resin film is between 10 μm to 100 μm and
   a plurality of empty spaces are provided between the tube and the covering.

2. The flexible tube of claim 1, wherein the fluorine-based resin film is provided on an inner circumferential surface of the covering.

3. The flexible tube of claim 1, wherein the fluorine-based resin film is provided on an outer circumferential surface of the tube.

4. The flexible tube of claim 1, wherein the fluorine-based resin film includes at least one of polytetrafluoroethylene (PTFE), tetrafluoroethylene-perfluoroalkyl vinyl ether copolymer (PFA), tetrafluoroethylene-hexafluoropropylene copolymer (FEP), and tetrafluoroethylene-ethylene copolymer (ETFE).

5. A flexible tube comprising:
   a tube made of metal and having a bellows shape;
   a covering made of metal and covering the tube; and
   a fluorine-based resin film provided between the tube and the covering, a thickness of the fluorine-based resin film is between 10 μm to 100 μm, the fluorine-based resin film being provided to one of the tube and the covering and being slidable along the other one of the tube and the covering.

6. The flexible tube of claim 5, wherein the fluorine-based resin film is provided on an inner circumferential surface of the covering.

7. The flexible tube of claim 5, wherein the fluorine-based resin film is provided on an outer circumferential surface of the tube.

8. The flexible tube of claim 5, wherein the fluorine-based resin film includes at least one of polytetrafluoroethylene (PTFE), tetrafluoroethylene-perfluoroalkyl vinyl ether copolymer (PFA), tetrafluoroethylene-hexafluoropropylene copolymer (FEP), and tetrafluoroethylene-ethylene copolymer (ETFE).

9. A flexible tube comprising:
   a tube made of metal and having a bellows shape including concave and convex portions;
   a covering made of metal and covering the concave and convex portions of the tube; and
   a fluorine-based resin film provided between the tube and the covering and directly attached to the concave and convex portions of the tube, a thickness of the fluorine-based resin film is between 10 μm to 100 μm, wherein
   a space is provided between the tube and the covering.

* * * * *